US007124860B2

(12) United States Patent
Souetre et al.

(10) Patent No.: US 7,124,860 B2
(45) Date of Patent: Oct. 24, 2006

(54) BRAKE SYSTEM FOR BRAKING AIRCRAFT WHEELS

(75) Inventors: Jean Souetre, Boulogne-Billancourt (FR); Thomas Durollet, Guyancourt (FR); Olivier Dereure, Paris (FR)

(73) Assignee: Messier Bugatti, Velizy Villacoublay (FR)

( * ) Notice: Subject to any disclaimer, the term of this patent is extended or adjusted under 35 U.S.C. 154(b) by 0 days.

(21) Appl. No.: 10/619,465

(22) Filed: Jul. 16, 2003

(65) Prior Publication Data

US 2004/0011602 A1 Jan. 22, 2004

(30) Foreign Application Priority Data

Jul. 19, 2002 (FR) .................................. 02 09196

(51) Int. Cl.
*F16D 55/36* (2006.01)

(52) U.S. Cl. ................ 188/71.5; 188/73.39; 188/73.31

(58) Field of Classification Search ............... 188/71.5, 188/73.39, 73.31, 18 A, 73.1, 73.2, 218 R, 188/73.35, 73.36, 73.37, 73.38
See application file for complete search history.

(56) References Cited

U.S. PATENT DOCUMENTS

| | | | | |
|---|---|---|---|---|
| 5,205,382 | A * | 4/1993 | Edmisten | 188/71.5 |
| 5,323,881 | A * | 6/1994 | Machan et al. | 188/71.5 |
| 6,003,641 | A | 12/1999 | Boehringer et al. | |
| 6,155,720 | A * | 12/2000 | Battig | 384/99 |
| 6,702,068 | B1 * | 3/2004 | Riebe | 188/71.5 |
| 6,752,248 | B1 * | 6/2004 | Berwanger | 188/71.5 |
| 2003/0042083 | A1 | 3/2003 | Berwanger | |

FOREIGN PATENT DOCUMENTS

| | | | |
|---|---|---|---|
| EP | 0 990 813 | A2 | 4/2000 |
| WO | WO 03/21126 | A1 | 3/2003 |

* cited by examiner

*Primary Examiner*—Robert A. Siconolfi
(74) *Attorney, Agent, or Firm*—Sughrue Mion, PLLC

(57) ABSTRACT

The invention relates to a brake system for braking aircraft wheels, the brake system being of the type which, for each wheel, comprises a stator central portion coaxially surrounding a wheel axle on which a rotor annular portion is mounted to rotate, and a succession of brake disks disposed between the stator central portion and the rotor annular portion with alternate disks being constrained to rotate with one and the other of said portions, said stator central portion being provided with a brake collar equipped with a plurality of sets of pistons and, rigidly secured to said collar, a torsion tube internally provided with a transverse annular web, a centering bearing being interposed between the annular web and the axle. According to the invention the centering bearing has structural characteristics that vary circumferentially in a distribution configuration suitable for generating different bearing stiffnesses along two orthogonal axes contained in a plane that is perpendicular to the axis of the axle.

12 Claims, 9 Drawing Sheets

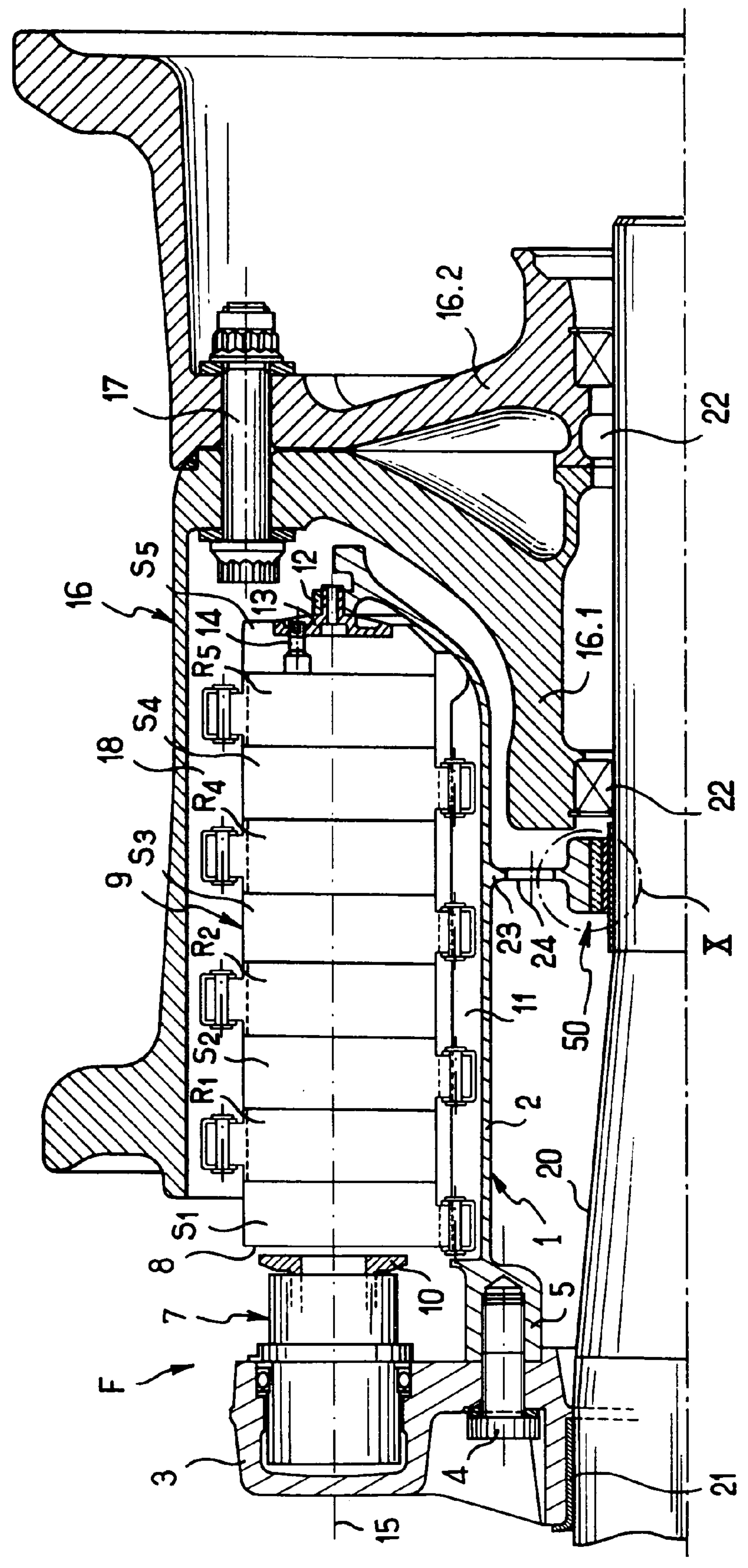
FIG_1

FIG_2
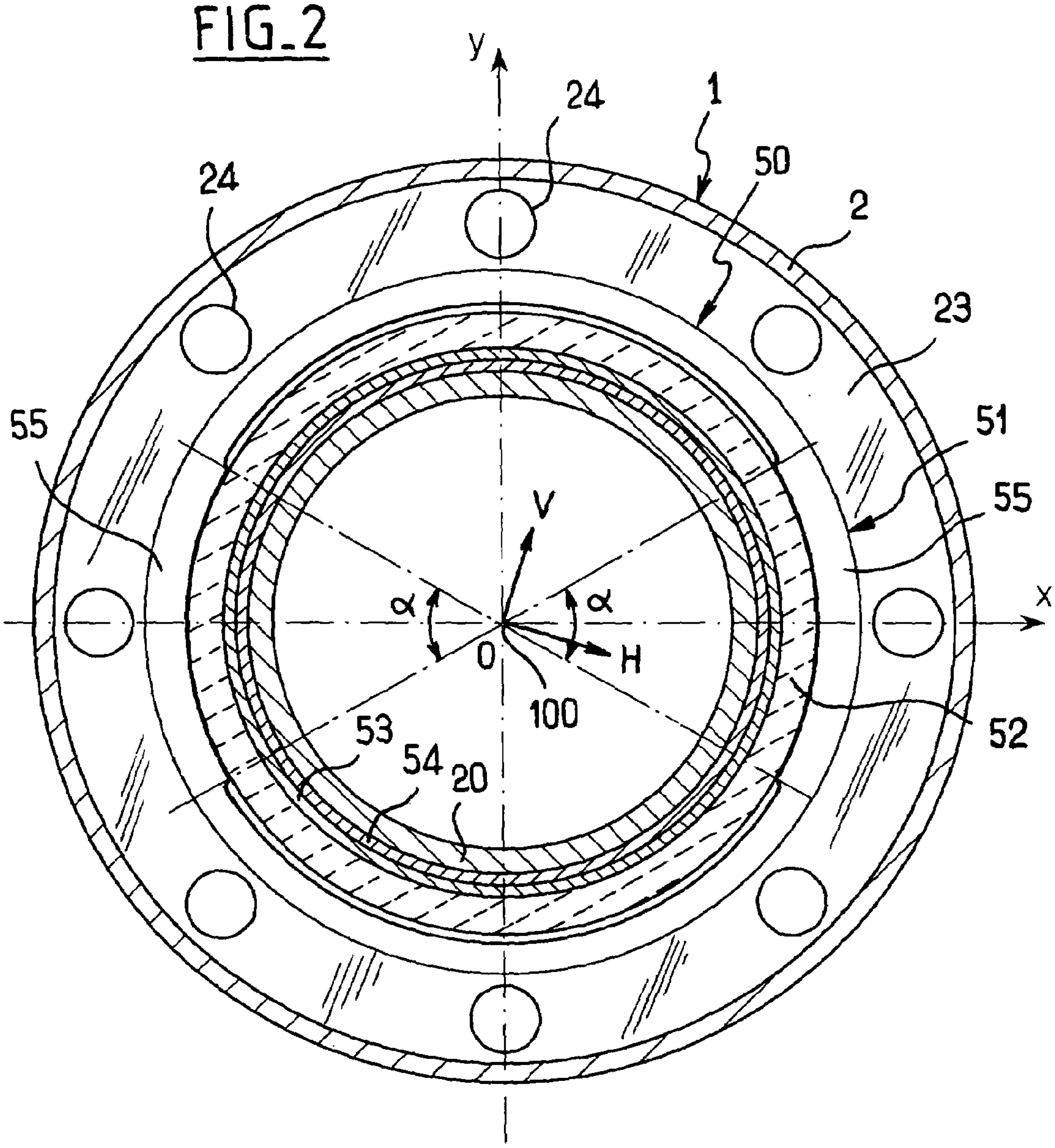
FIG_10
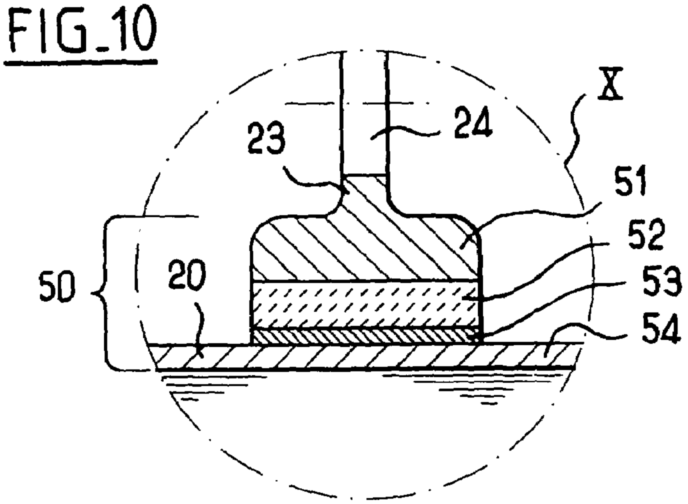

FIG_4

FIG_5

FIG_7
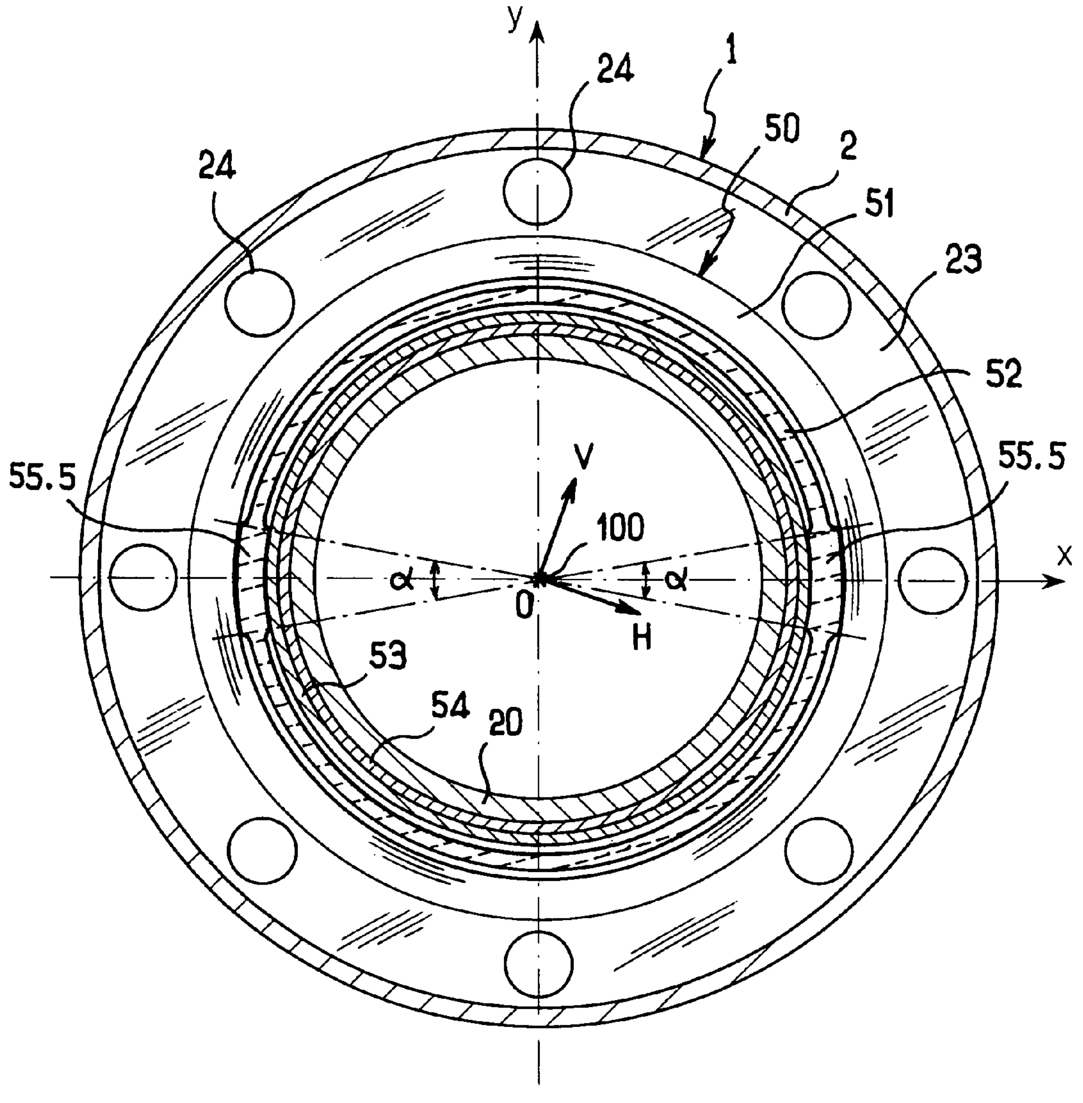

FIG_8
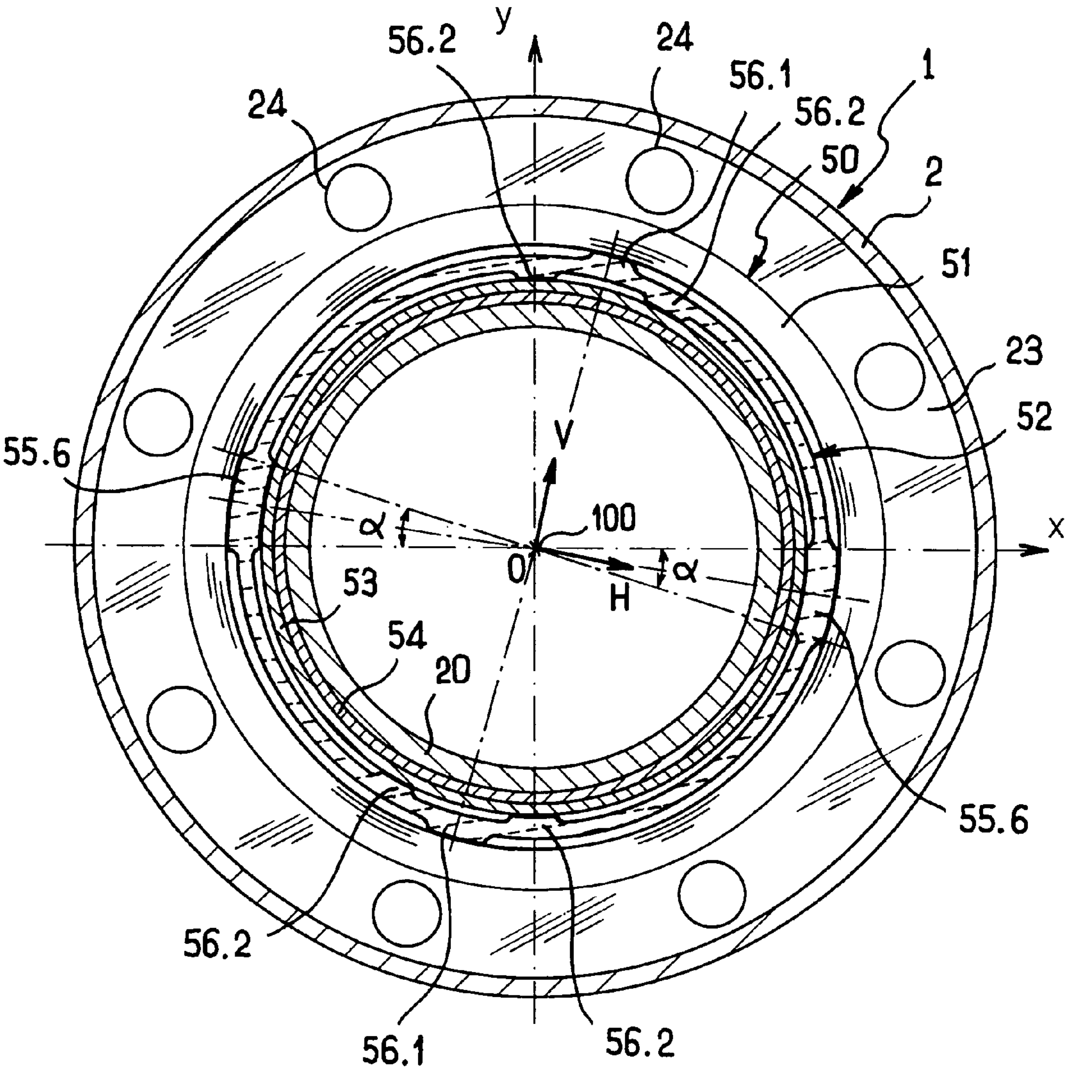

FIG_9
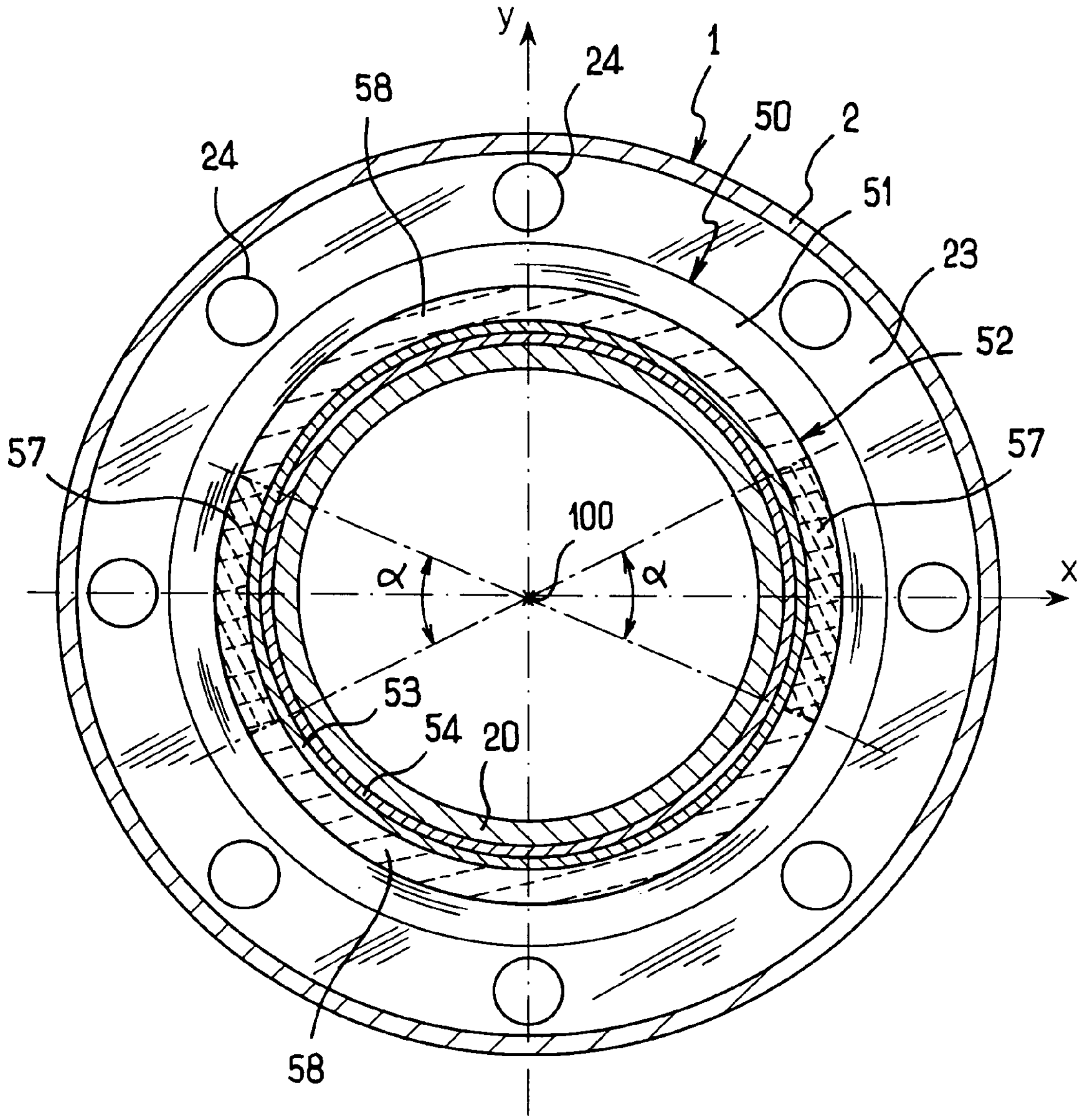

BRAKE SYSTEM FOR BRAKING AIRCRAFT WHEELS

FIELD OF THE INVENTION

The present invention relates to a brake system for braking aircraft wheels, the brake system being of the type which, for each wheel, comprises a stator central portion coaxially surrounding a wheel axle on which a rotor annular portion is mounted to rotate, and a succession of brake disks disposed between the stator central portion and the rotor annular portion with alternate disks being constrained to rotate with one and the other of said portions.

BACKGROUND OF THE INVENTION

Such brake systems having stacks of disks (generally made of carbon) are in widespread use on aircraft of recent design. Generally, the stator central portion is provided with a brake collar equipped with a plurality of sets of pistons and, rigidly secured to said collar, a torsion tube. The stator portion is supported on the axle in question firstly at the brake collar, and secondly at a transverse annular web present inside the torsion tube. A centering bearing is then interposed between the annular web and the axle. Reference may be made, for example, to Documents U.S. Pat. No. 6,003,641 and EP-A-0 990 813.

In conventional landing gear, a landing gear leg is provided together with a telescopic rod to the end of which a wheel lever carrying a pair of wheels is hinged. The wheel lever is thus hinge mounted on a yoke secured to the bottom end of the telescopic rod, and a bar is interposed between the brake collar and one of the branches of the above-mentioned yoke for the purpose of taking up the torsion forces generated during braking.

When the brake system is actuated by the pilot, the axles are subjected to simple flexing in two perpendicular directions, which corresponds to two coupled characteristic modes. In addition, the structure which surrounds the axle is also subjected to flexing forces of the same type, generating dynamic deformations of the same type, which deformations take place with a small amount of phase delay relative to the deformations of the axle. The two coupled modes combine to generate an unstable mode, and specialists know that if the two modes have frequencies that are close to each other, the probability of the two modes combining into an unstable mode is high. Thus, an approach has emerged aiming to move the characteristic modes apart to so as to prevent the resulting unstable mode from appearing.

Proposals have been made to act hydraulically on the brake collar by throttling hydraulic fluid to generate damping. However, in addition to being complex, such a solution is unsatisfactory in terms of reliability, in particular in the event of hydraulic failure.

Attempts have also been made to act on the stiffness of the torsion tube by using a sandwich of different materials. That theoretically makes it possible to adapt the axial stiffness of the torsion tube or of the surrounding structure. However, in that approach, it is extremely difficult to control the stiffnesses reliably in different directions.

A more advantageous solution has recently been proposed, aiming to make use of the presence of the transverse annular web by constraining said web to have a particular and non-uniform behavior. Unlike the other conventional designs in which the transverse annular web is uniformly perforated with circular holes, that solution has focused on providing slots which are circumferentially elongate, which slots generate asymmetry. The axle is then retained on a portion of circumference with rigidity that is larger in one zone than in the residual zone associated with the presence of circumferential slots. By appropriately selecting the angular extent of the circumferential slots and their positions relative to the main axes, that solution appears to make it possible to lower the low-frequency mode. However, such an approach suffers from the drawback of weakening the transverse annular web. In addition, modifying radial stiffnesses also induces a modification in axial stiffness, which is also unfavorable structurally.

OBJECT OF THE INVENTION

An object of the present invention is to design a brake system which is also organized to obtain different characteristic modes, which is, in particular favorable for withstanding the whirl deformation which is encountered in brake structures both in the axles and in the structures surrounding said axles.

An object of the invention is thus to design a brake system organized to have optimum anti-vibration behavior, in particular with regard to whirl.

GENERAL DEFINITION OF THE INVENTION

This problem is solved by a brake system for braking aircraft wheels, the brake system being of the type which, for each wheel, comprises a stator central portion coaxially surrounding a wheel axle on which a rotor annular portion is mounted to rotate, and a succession of brake disks disposed between the stator central portion and the rotor annular portion with alternate disks being constrained to rotate with one and the other of said portions, said stator central portion being provided with a brake collar equipped with a plurality of sets of pistons and, rigidly secured to said collar, a torsion tube internally provided with a transverse annular web, a centering bearing being interposed between the annular web and the axle, said brake system being remarkable in that the centering bearing has structural characteristics that vary circumferentially in a configuration suitable for generating different bearing stiffnesses along two orthogonal axes contained in a plane that is perpendicular to the axis of the axle.

Thus, unlike the prior solution recalled above that provides circumferential slots in the transverse annular web, it is the centering bearing that performs the function of guaranteeing different characteristic modes along two orthogonal axes, with a view in particular to obtaining behavior that is very favorable with regard to whirl, the transverse annular web remaining as in traditional equipment, i.e. it is not weakened.

In a first embodiment, the structural characteristics of the centering bearing that vary circumferentially relate to the radial thickness, so as to define at least one partial annular bearing. In particular, an even number of partial annular bearings are provided that are diametrically opposite in pairs.

Preferably, the partial annular bearing or each of the partial annular bearings extends over an angular sector essentially lying in the range 15° to 60°.

It is also possible to make provision for the partial annular bearing(s) to be offset angularly so as to be centered on a direction corresponding substantially to a real horizontal or vertical direction. This makes it possible to take account of the inclination that is frequently encountered for the landing gear leg relative to the vertical when the landing gear is extended, so as to have different stiffnesses along perpendicular axes which correspond essentially to the real horizontal and vertical directions.

More precisely, the brake system of the invention is a system in which the centering bearing is defined by a tube foot which is formed integrally with the transverse annular web, and by at least one annular ring associated with the tube foot or with the axle.

The partial annular bearings may then be provided on the tube foot by being defined by locally recessing said tube foot, or in a variant they may be provided on an annular ring associated with the tube foot by being defined by locally recessing said annular ring, or in another variant they may be provided on an annular ring associated with the axle by being defined by locally recessing said annular ring, or in yet another variant, they may be provided on the axle by being defined by locally recessing said axle.

When an annular ring is associated with the tube foot, it is possible to make provision for the partial annular bearings to be supplemented by alternating bearings, each of which has a single bearing surface either on the outside or on the inside of the annular ring in question.

In another embodiment, the structural characteristics of the centering bearing that vary circumferentially relate to the component material, by alternating annular zones made of materials of different stiffnesses, or of a material which is selected to be anisotropic, said annular zones being disposed over predetermined angular sectors. By appropriately selecting the material(s) in question, it is thus possible to obtain the desired stiffnesses in the two orthogonal directions in question.

Other characteristics and advantages of the invention appear more clearly from the following description and from the accompanying drawings relating to a particular embodiment.

BRIEF DESCRIPTION OF THE DRAWINGS

The description is given with reference to the figures of the accompanying drawings, in which:

FIG. 1 is an axial half section view showing a brake system of the invention, with a centering bearing which has structural characteristics that vary circumferentially, which is shown in section, and which can be seen more clearly in FIG. 10 which is a fragmentary view on a larger scale of the detail X of FIG. 1;

FIG. 2 is a fragmentary section view of the torsion tube in the vicinity of the transverse annular web of said tube, showing more clearly the configuration of the partial annular bearings (two bearings in this example) which, in this example, are provided on the foot of the tube;

FIGS. 3 to 7 are section views analogous to the section view of FIG. 2, showing various variants in which the partial annular bearings are provided on an annular ring associated with the tube foot, said bearings being organized to have different angular sectors or different angular configurations;

FIG. 8 shows another variant in which the two partial annular bearings are offset angularly for directional correction purposes, and are further supplemented with alternating bearings, each of which has a single bearing surface; and FIG. 9 is an analogous section showing another variant in which the differences in stiffness of the centering bearing are obtained by disposing in alternation annular zones made of materials of different stiffnesses or of the same material that is selected to be anisotropic, and, in this example, for an annular ring associated with the tube foot.

DETAILED DESCRIPTION OF THE INVENTION

Figure 3:
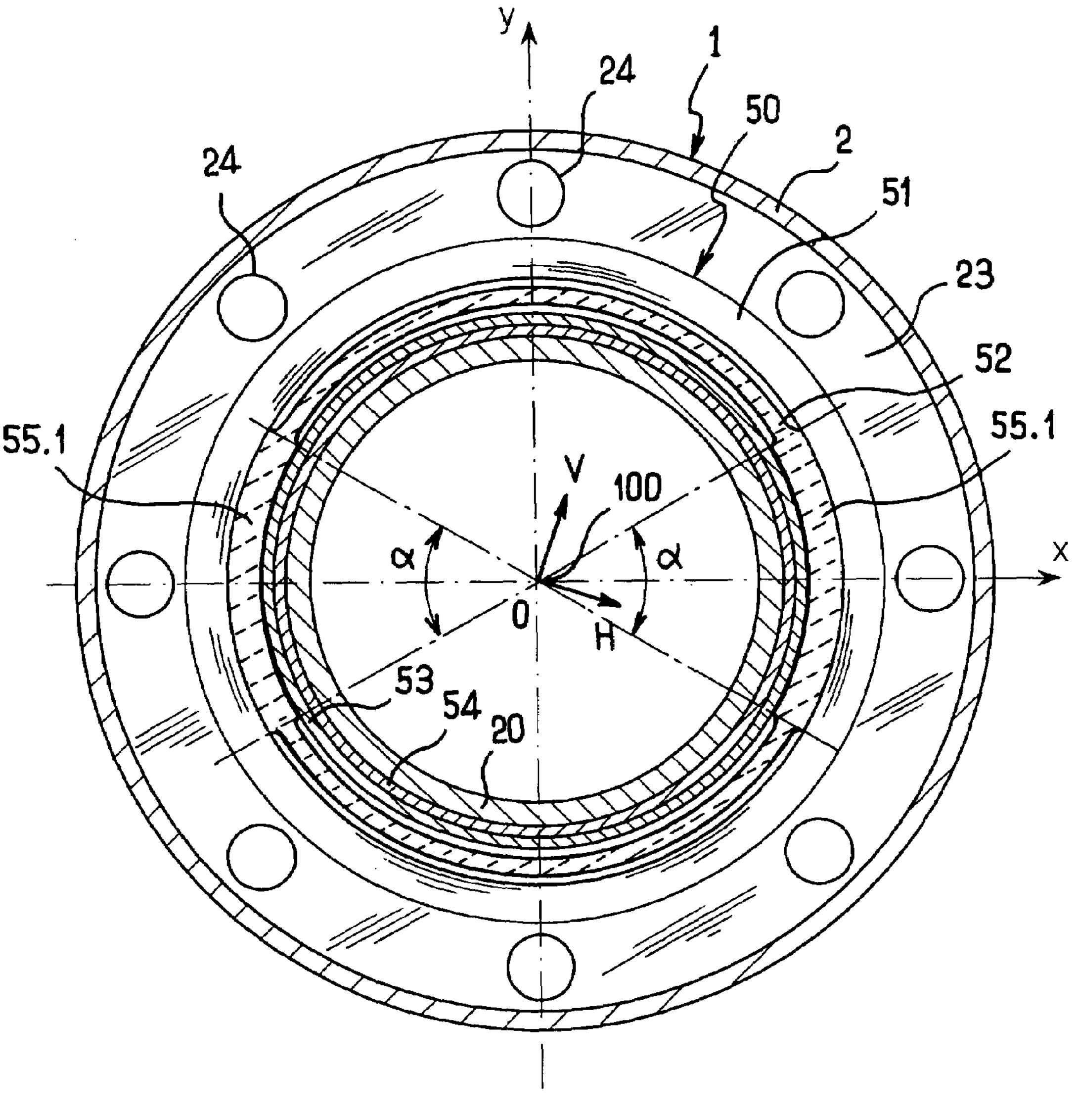

FIG. 1 shows an aircraft brake unit F comprising a central stator portion 1 which has an axis 100 and which includes a torsion tube 2 to the front of which a brake collar or the like 3 is fixed, e.g. by means of bolts 4 that are screwed into an end collar 5 of said torsion tube. Said brake collar may be of the hydraulic or the electrical type, and, in this example it is equipped with a set of pistons 7 capable of traveling over a predetermined wear stroke by means, for example, of an integrated wear take-up system. Each piston, referenced 10, also serves to transmit the braking forces, the axis of the piston assembly 7 shown being referenced 15.

The stator central portion 1 coaxially surrounds a wheel axle 20 on which a rotor annular portion 16 is mounted to rotate. For example, as is frequent, it is possible to make provision for the rotor portion 16 to be made up of two adjoining components 16.1, 16.2 united by bolts 17, to form a wheel rim. The rotor annular portion 16 is mounted to rotate on the axle 20 via associated rolling bearings 22.

In entirely conventional manner, the brake system further comprises succession of brake disks which are disposed between the stator central portion 1 and the rotor annular portion 16. Some of said disks are constrained to rotate with the torsion tube 2 by associated axial keys such as the key 11, which disks are referenced S1, S2, S3, S4, S5, while other disks, disposed in alternation with the above-mentioned disks, are constrained to rotate with the rotor annular portion 15 by associated axial keys 18, which disks are referenced R1, R2, R3, R4. The stack of disks $S_i$, $R_j$, referenced 9 thus receives from one side the braking forces on the front free face 8 of said stack via the active faces of the various pistons 10, the various disks making up the stack 9 having some freedom to move relative to the associated keys 11, 18 in order to move progressively as they wear. In this example, the last disk S5, which is constrained to rotate with the torsion tube 2, does not pass over the keys of the torsion tube, as the last disk usually does, but rather it is connected via torque take-up studs 13 which are distributed circumferentially, said studs 13 being fixed by rivets 14 in associated recesses in the back face of said disk, and fastened to an associated collar 12 that is rigidly secured to the torsion tube 2.

The stator central portion 1 is mounted on an axle 20 via a first bearing provided in the vicinity of the front at the brake collar 3 and in the form of a ring 21. In addition, the torsion tube 2 is internally provided with a transverse annular web 23 which is lightened by circular perforations 24 distributed uniformly around its circumference, as is conventional in the art. A centering second bearing is then interposed between the annular web 23 and the axle 20. Said centering bearing is given overall reference 50 in FIG. 1.

According to an essential characteristic of the invention, the above-mentioned centering bearing 50 has structural characteristics that vary circumferentially in a distribution configuration suitable for generating different bearing stiffnesses along two orthogonal axes contained in a plane that is perpendicular to the axis 100 of the axle 20.

The various components forming the centering bearing 50 can be seen more clearly on the larger-scale detail view of FIG. 10, corresponding to the detail X of FIG. 1. In succession going towards the axis of the axle, FIG. 10 shows a tube foot 51 which is formed integrally with the transverse annular web 23, then a first ring 52 preferably made of a synthetic material, and then a metal ring 53, e.g. a bronze ring, the rings 52 and 53 being associated with the tube foot 51. In addition, in this example, although not essential, FIG. 10 shows an additional ring 54 which, in this example, is a metal ring analogous to a covering sleeve, and which is associated with the axle 20, and finally the peripheral surface of the axle 20 itself.

As explained in more detail below, and according to a characteristic of the invention, the different bearing stiffnesses may be provided on the tube foot 51 or on any one of the above-mentioned annular rings 52, 53, 54, or else on the axle 20 itself.

In a first embodiment of the invention, the structural characteristics of the centering bearing 50 that vary circumferentially relate to the radial thickness, so as to define at least one partial annular bearing. Such an approach is shown in a plurality of variants in FIGS. 2 to 8.

In FIG. 2, two partial annular bearings 55 are provided on the tube foot 51. Said partial annular bearings 55 are diametrically opposite, and they are defined by locally recessing the tube foot 51. Each of the partial annular bearings 55 extends over an angular sector referenced $\alpha$, which preferably essentially lies in the range 15° to 60°.

In FIG. 2, OX and OY designate two orthogonal axes which are contained in a plane perpendicular to the axis 100 of the axle 20, and along which the different radial thicknesses of the tube foot 51 generate different bearing stiffnesses, with high stiffness along the axis OX (which is perpendicular to the main axis of the landing gear leg), and lower stiffness along the axis OY (which is parallel to the main axis of the landing gear leg). In this embodiment, the annular rings 52, 53, 54 are of radial thickness that is constant over their entire circumferences.

FIG. 2 also shows two axes OH and OV which correspond respectively to the real horizontal direction and to the real vertical direction. This offset relative to the axes OX and OY is indicated to show the case when the main axis of a landing gear leg can also be inclined slightly relative to the vertical.

Two different bearing stiffnesses are thus obtained along the axes OX and OY, with characteristic modes of vibration that are therefore significantly different from each other, which is favorable for minimizing whirl deformation.

The above-indicated angular sector of in the range 15° to 60° is given by way of example. However, if each of the partial annular bearings extends over an angular sector that is smaller than 15°, centering the recessed element becomes difficult to control, and if the value of 60° is exceeded, the mode corresponding to lowest rigidity is not clearly different from the other mode.

In the variants shown in FIGS. 3 to 8, the partial annular bearings are provided on the annular ring 52 from among the rings associated with the tube foot 51, instead of being provided on the tube foot 51 as they are in the variant shown in FIG. 2. The annular bearings, of which there are two in these variants, are, for example, defined by locally recessing the annular ring 52. In these variants too, each of the partial annular bearings preferably extends over an angular sector essentially lying in the range 15° to 60°.

FIG. 3 shows two diametrically opposite annular bearings 55.1, each of which extends over an angular sector of 60°. As above, the overall angular position relative to the axis OY which corresponds to the ideal vertical plane of the collar is offset angularly relative to the real horizontal and vertical directions indicated by the axes OH and OV.

Figure 4:
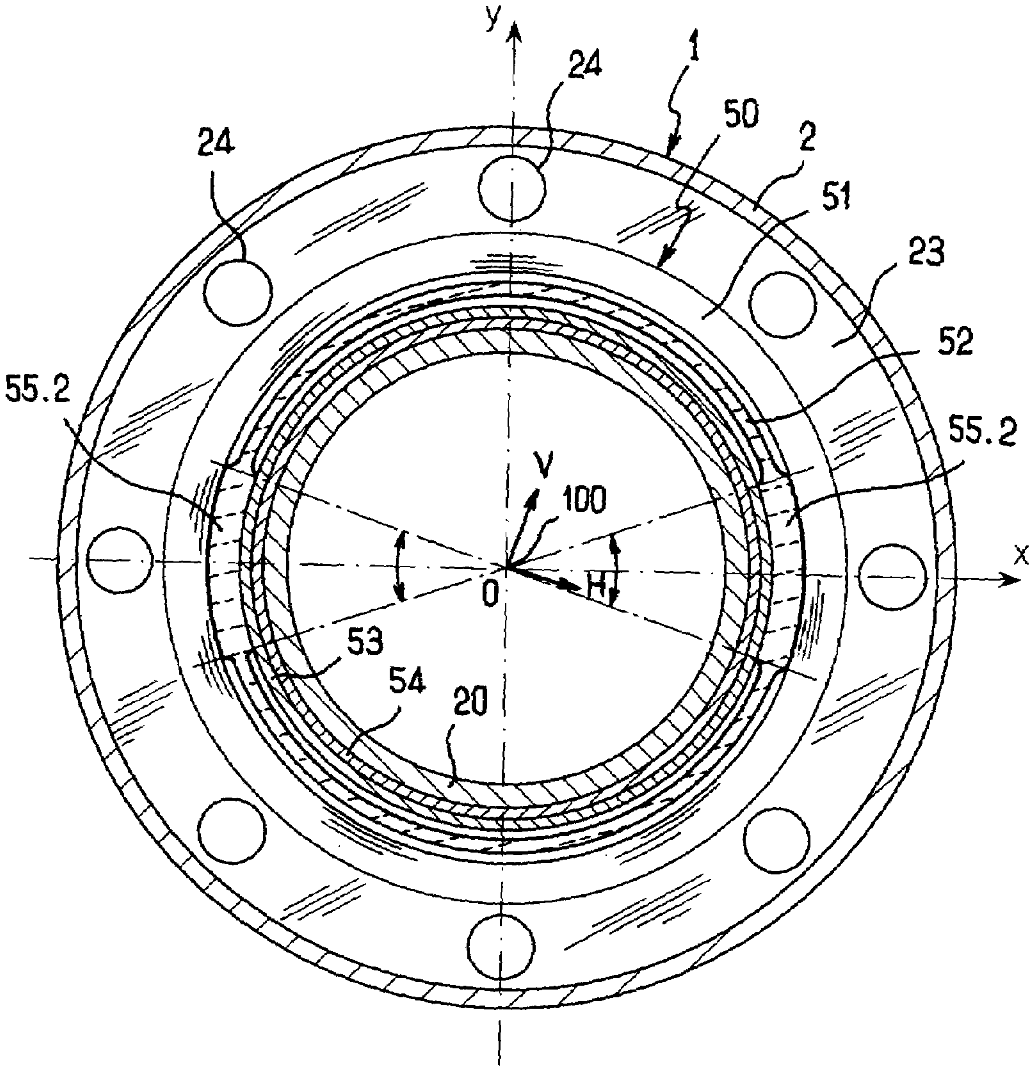
Figure 5:
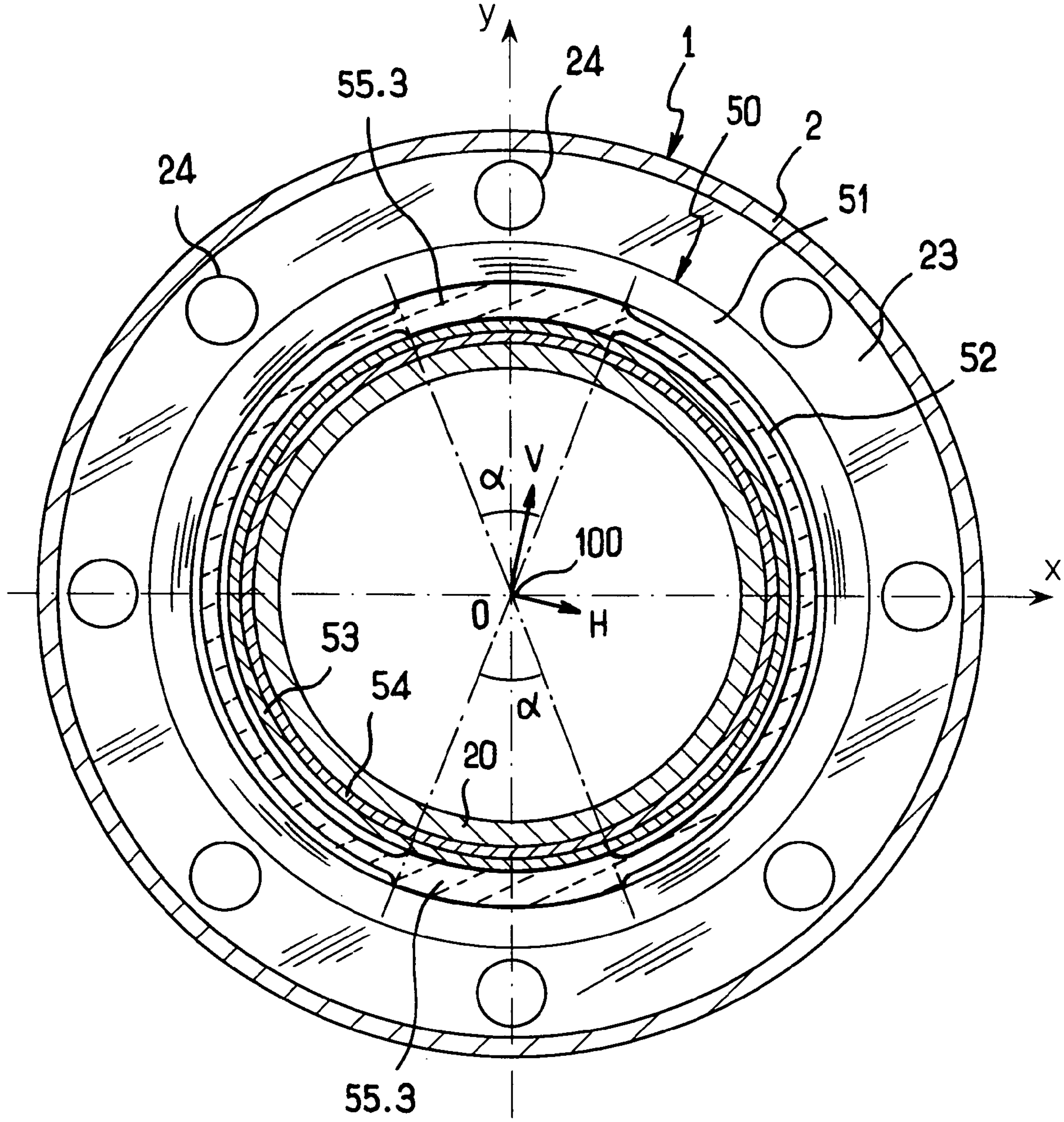

FIG. 4 shows two symmetrical bearings 55.2, each of which extends over an angular sector of 40°. FIG. 5 shows two symmetrical bearings 55.3, each of which also extends over an angular sector of 40°, but which are disposed at 90° relative to the preceding angular position.

Thus, with FIG. 4, preference is given to obtaining the high stiffness in the general direction of drag, and the lower stiffness in the general direction of loading, whereas, in FIG. 5, preference is given to obtaining the high stiffness in the general direction of loading, and the lower stiffness in the general direction of drag.

Figure 6:
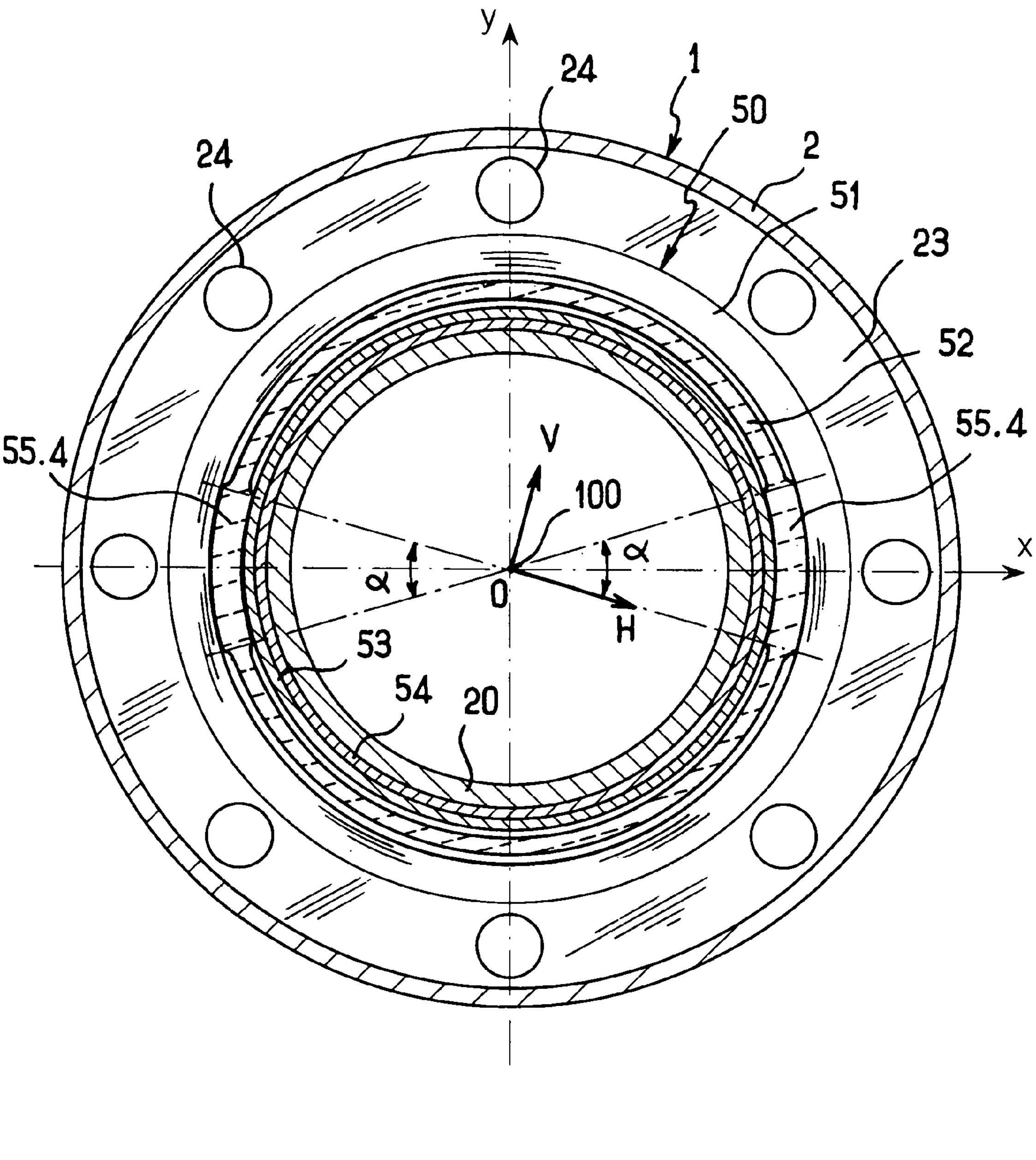

In FIG. 6, the two partial annular bearings 55.4 are symmetrical, and each of them extends over an angular sector of 30°. In FIG. 7, each of the two partial annular bearings 55.5 extends over an angular sector of 20°.

FIG. 8 shows a more complex variant having firstly two partial annular bearings 55.6, each of which extends over an angular sector of about 15°. Unlike the preceding embodiments, these partial annular bearings 55.6 are offset angularly so as to be centered on a direction corresponding substantially to a real horizontal direction or to a real vertical direction. In this variant, the angular offset, which is about 15°, makes it possible to achieve centering on a direction corresponding substantially to the real horizontal direction OH.

In addition, the two partial annular bearings 55.6 are supplemented by bearings 56.1, 56.2 disposed in alternation and each of which has a single bearing surface either on the outside or on the inside of the annular ring 52 in question. In this example, two diametrically opposite bearings 56.1 are provided that have their bearing surfaces on the outside, and two pairs of diametrically opposite bearings 56.2 are provided on either side of each bearing 56.1 and that have their bearing surfaces on the inside of the annular ring 52. The partial annular bearings 55.6 and the alternating bearings 56.1 and 56.2 are preferably defined by locally recessing the annular ring 52.

Naturally, the partial annular bearings that are described above for the annular ring may be provided on the other ring 53 associated with the tube foot 51, or on the ring 54 which is associated with the axle 20, or even on the axle 20 itself. These variants are not shown herein because exactly the same considerations apply as above.

In the above-described embodiments, the circumferentially-varying structural characteristics of the centering bearing relate to radial thickness, so as to define at least one partial annular bearing. However, the same function may be achieved differently by making provision for the structural characteristics of the centering bearing 50 that vary circumferentially to relate to the component material, by alternating annular zones made of materials of different stiffnesses, or, in a variant, made of the same material selected to be anisotropic, said annular zones being organized to extend over predetermined angular sectors.

Such a variant is shown in FIG. 9, in which, in order to constitute the annular ring 52, annular zones 57, 58 are provided that are made of materials of different stiffnesses. Each of the two diametrically opposite annular zones 57 extend over an angular sector referenced $\alpha$ which also essentially lies in the range 15° to 60°, and said zones are, for example, made of a material of high stiffness. The two additional zones 58 may then be made of another material of lower stiffness. In a variant, the same effect may be obtained using a component material that is selected to be anisotropic. For example, it is possible to provide zones made of a fibrous material that is wound so as to have high rigidity, and a fibrous material using fibers parallel to the axis of the ring for the lower rigidity zones. In a variant, it is possible to provide fibers compressed alternately in a radial direction and in an axial direction (anisotropic material).

Here too, the differences in stiffness along two orthogonal axes contained in a plane perpendicular to the axis of the axle induce the desired asymmetry in the stiffnesses, so as to have two characteristic modes that are very different from each other and that are combined into a resulting mode which is favorable with respect to the whirl deformations.

The Applicant has performed calculations aimed at quantifying the decoupling of the real modes involved in the second whirl mode, which decoupling is obtained as a function of the various configurations that are described above. Thus, for the embodiments shown in FIGS. 3 to 8, it is possible to mention respective decoupling values of about 20 hertz (Hz), 10 Hz, 40 Hz, 58 Hz, 68 Hz, and 75 Hz, whereas with a conventional design, the decoupling that is obtained is only about 8 Hz. This shows clearly the advantage of the centering bearing having structural characteristics that vary circumferentially.

It can be thus be understood that the embodiment shown in FIG. 8 (which is the most elaborate), by combining a pair of partial annular bearings that are offset angularly with a plurality of alternating bearings having single bearing surfaces, it is possible to obtain optimum decoupling for the second whirl mode.

The invention is not limited to the above-described embodiments, but rather it covers any variant reproducing the above-mentioned characteristics by using equivalent means.

What is claimed is:

1. A brake system for braking aircraft wheels, the brake system being of the type which, for each wheel, comprises a stator central portion coaxially surrounding a wheel axle on which a rotor annular portion is mounted to rotate, and a succession of brake disks disposed between the stator central portion and the rotor annular portion with alternate disks being constrained to rotate with one and the other of said portions, said stator central portion being provided with a brake collar equipped with a plurality of sets of pistons and, rigidly secured to said collar, a torsion tube internally provided with a transverse annular web, a centering bearing being interposed between the annular web and the axle, wherein the centering bearing has structural characteristics that vary circumferentially in a distribution configuration suitable for generating different bearing stiffnesses along two axes that are orthogonal to each other and are contained in a plane that is perpendicular to the axis of the axle.

2. A brake system according to claim 1, wherein the structural characteristics of the centering bearing that vary circumferentially relate to the radial thickness, so as to define at least one partial annular bearing.

3. A brake system according to claim 2, wherein an even number of partial annular bearings are provided that are diametrically opposite in pairs.

4. A brake system according to claim 2, wherein the partial annular bearing or each of the partial annular bearings extends over an angular sector essentially lying in the range 15° to 60°.

5. A brake system according to claim 2, wherein the partial annular bearing(s) is/are offset angularly so as to be centered on a direction corresponding substantially to a real horizontal or vertical direction.

6. A brake system according to claim 2, in which the centering bearing is defined by a tube foot which is formed integrally with the transverse annular web, and by at least one annular ring associated with the tube foot or with the axle, wherein the partial annular bearings are provided on the tube foot, and are defined by locally recessing said tube foot.

7. A brake system according to claim 2, in which the centering bearing is defined by a tube foot which is formed integrally with the transverse annular web, and at least one annular ring associated with the tube foot or with the axle, wherein the partial annular bearings are provided on an annular ring associated with the tube foot, and are defined by locally recessing said annular ring.

8. A brake system according to claim 7, wherein the partial annular bearings are supplemented by alternating bearings, each of which has a single bearing surface either on the outside or on the inside of the annular ring in question.

9. A brake system according to claim 2, in which the centering bearing is defined by a tube foot which is formed integrally with the transverse annular web, and at least one annular ring associated with the tube foot or with the axle, wherein the partial annular bearings are provided on an annular ring associated with the axle, and are defined by locally recessing said annular ring.

10. A brake system according to claim 2, in which the centering bearing is defined by a tube foot which is formed integrally with the transverse annular web, and at least one annular ring associated with the tube foot or with the axle, wherein the partial annular bearings are provided on the axle, and are defined by locally recessing said axle.

11. A brake system according to claim 1, wherein the structural characteristics of the centering bearing that vary circumferentially relate to the component material, by alternating annular zones made of materials of different stiffnesses, said annular zones being disposed over predetermined angular sectors.

12. A brake system according to claim 1, wherein the structural characteristics of the centering bearing that vary circumferentially relate to the component material which is selected to be anisotropic so as to have annular zones of different stiffnesses, said annular zones being disposed over predetermined angular sectors.

* * * * *